(12) United States Patent (10) Patent No.: US 9,158,849 B2
Xian et al. (45) Date of Patent: Oct. 13, 2015

(54) SYNTHESIS OF WEBPAGE SNIPPETS USING SUB-PAGES OF THE WEBPAGE

(71) Applicant: GOOGLE INC., Mountain View, CA (US)

(72) Inventors: Junli Xian, Mountain View, CA (US); Harvey Jones, Mountain View, CA (US); Samarth Keshava, Mountain View, CA (US)

(73) Assignee: Google Inc., Mountain View, CA (US)

( * ) Notice: Subject to any disclaimer, the term of this patent is extended or adjusted under 35 U.S.C. 154(b) by 64 days.

(21) Appl. No.: 13/770,401

(22) Filed: Feb. 19, 2013

(65) Prior Publication Data

US 2015/0169753 A1 Jun. 18, 2015

Related U.S. Application Data

(60) Provisional application No. 61/601,519, filed on Feb. 21, 2012.

(51) Int. Cl.
*G06F 17/30* (2006.01)
(52) U.S. Cl.
CPC .................. *G06F 17/30864* (2013.01)
(58) Field of Classification Search
CPC .......... G06F 17/30873; G06F 17/3089; G06F 17/30905
See application file for complete search history.

(56) References Cited

U.S. PATENT DOCUMENTS

| 6,754,873 | B1* | 6/2004 | Law et al. ...................... 715/208 |
| 2006/0287985 | A1* | 12/2006 | Castro et al. ...................... 707/3 |
| 2010/0049709 | A1* | 2/2010 | Ravikumar et al. ............... 707/6 |
| 2012/0041768 | A1* | 2/2012 | Reese ............................. 705/1.1 |
| 2012/0166973 | A1* | 6/2012 | Gurevich et al. ............... 715/760 |
| 2013/0031075 | A1* | 1/2013 | El Daher et al. .............. 707/706 |

\* cited by examiner

*Primary Examiner* — Khanh Pham
(74) *Attorney, Agent, or Firm* — Harrity & Harrity, LLP

(57) ABSTRACT

A server device is configured to identify sub-pages corresponding to a particular webpage, where the particular webpage and the identified sub-pages may be associated with a same website; determine titles for the identified sub-pages; process the identified sub-pages to select a set of sub-pages, of the identified sub-pages, to use to generate a snippet for the particular webpage, where each webpage, in the set of sub-pages, may satisfy particular criteria, and a quantity of the set of sub-pages may be based on a length of a concatenation of the titles for the set of sub-pages; generate the snippet, for the particular webpage, using the titles for the set of sub-pages; and store the generated snippet in association with the particular webpage, where the generated snippet may be presented in a search result document when the particular webpage is identified as being relevant to a search query.

20 Claims, 10 Drawing Sheets

SYNTHESIS OF WEBPAGE SNIPPETS USING SUB-PAGES OF THE WEBPAGE

RELATED APPLICATION

This application claims priority to and is a non-provisional application of U.S. Provisional Application No. 61/601,519, filed Feb. 21, 2012, the content of which is incorporated herein by reference.

BACKGROUND

Many techniques are available to users today to find information on the world wide web ("web"). For example, users often use web browsers and/or search engines to find information of interest. In response to a search query, a search engine may provide a search result document that includes a listing of webpages that were determined by the search engine to be relevant to the search query. Each webpage, in the listing of webpages, may be presented to the user as a title, a link to the webpage, and a short description of the webpage. The short description of the webpage is commonly referred to as a snippet.

A snippet, for a webpage, may include text from the webpage. The text may be selected to include one or more of the terms of the search query. This can be beneficial in allowing the user to evaluate the relevance of the search query, as the snippet provides the user with context in which the webpage uses the search query.

SUMMARY

In some possible implementations, a method, performed by one or more server devices, may include identifying sub-pages corresponding to a particular webpage, where the particular webpage and the identified sub-pages may be associated with a same website; determining titles for the identified sub-pages; processing the identified sub-pages to select a set of sub-pages, of the identified sub-pages, to use to generate a snippet for the particular webpage, where each of the set of sub-pages may satisfy particular criteria, and a quantity of the set of sub-pages may be based on a length of a concatenation of the titles for the set of sub-pages; generating the snippet, for the particular webpage, using the titles for the set of sub-pages; and storing the generated snippet in association with the particular webpage, where the generated snippet may be presented in a search result document when the particular webpage is identified as being relevant to a search query.

In some possible implementations, processing the identified sub-pages to select the set of sub-pages may include determining that one of the set of sub-pages is linked to by the particular webpage, and selecting the one of the set of sub-pages to use to generate the snippet based on the one of the set of sub-pages being linked to by the particular webpage.

In some possible implementations, processing the identified sub-pages to select the set of sub-pages may include determining a measure of quality of one of the set of sub-pages, determining that the measure of quality, of the one of the set of sub-pages, satisfies a threshold, and selecting the one of the set of sub-pages to use to generate the snippet based on the measure of quality, of the one of the set of sub-pages, satisfying the threshold.

In some possible implementations, processing the identified sub-pages to select the set of sub-pages may include determining a length of the title for one of the set of sub-pages, determining that the length of the title, for the one of the set of sub-pages, satisfies a threshold, and selecting the one of the set of sub-pages to use to generate the snippet based on the length of the title, for the one of the set of sub-pages, satisfying the threshold.

In some possible implementations, processing the identified sub-pages to select the set of sub-pages may include determining that the title, for one of the set of sub-pages, lacks one or more particular characters, and selecting the one of the set of sub-pages to use to generate the snippet based on the title, for the one of the set of sub-pages, lacking the one or more particular characters.

In some possible implementations, processing the identified sub-pages to select the set of sub-pages may include determining a first length of the title for one of the set of sub-pages; determining a second length of one or more of the titles of one or more of the set of sub-pages, where the one or more of the set of sub-pages may be different from the one of the set of sub-pages; determining a total length based on a sum of the first length and the second length; determining that the total length satisfies a threshold; and selecting the one of the set of sub-pages to use to generate the snippet based on the total length satisfying the threshold.

In some possible implementations, generating the snippet may include concatenating the titles, for the set of sub-pages, to form a concatenation of titles, and generating the snippet using the concatenation of titles.

In some possible implementations, a system may include one or more server devices. The one or more server devices may identify sub-pages corresponding to a particular webpage, where the particular webpage and the identified sub-pages may be associated with a same website; determine titles for the identified sub-pages; process the identified sub-pages to select a set of sub-pages, of the identified sub-pages, to use to generate a snippet for the particular webpage, where each of the set of sub-pages may satisfy particular criteria, and a quantity of the set of sub-pages may be based on a length of a concatenation of the titles for the set of sub-pages; generate the snippet, for the particular webpage, using the titles for the set of sub-pages; and store the generated snippet in association with the particular webpage, where the generated snippet may be presented in a search result document when the particular webpage is identified as being relevant to a search query.

In some possible implementations, the one or more server devices, when processing the identified sub-pages to select the set of sub-pages, may determine a measure of quality of one of the set of sub-pages, determine that the measure of quality, of the one of the set of sub-pages, satisfies a threshold, and select the one of the set of sub-pages to use to generate the snippet based on the measure of quality, of the one of the set of sub-pages, satisfying the threshold.

In some possible implementations, the one or more server devices, when processing the identified sub-pages to select the set of sub-pages, may determine a length of the title for one of the set of sub-pages, determine that the length of the title, for the one of the set of sub-pages, satisfies a threshold, and select the one of the set of sub-pages to use to generate the snippet based on the length of the title, for the one of the set of sub-pages, satisfying the threshold.

In some possible implementations, the one or more server devices, when processing the identified sub-pages to select the set of sub-pages, may determine a first length of the title for one of the set of sub-pages; determine a second length of one or more of the titles of one or more of the set of sub-pages, where the one or more of the set of sub-pages may be different from the one of the set of sub-pages; determine a total length based on a sum of the first length and the second length; determine that the total length satisfies a threshold; and select the one of the set of sub-pages to use to generate the snippet based on the total length satisfying the threshold.

In some possible implementations, the one or more server devices, when identifying the sub-pages, may determine the sub-pages based on a link structure or a website hierarchy of the website, where the sub-pages may be determined based on positions of the sub-pages, relative to the particular webpage, in the link structure or the website hierarchy.

In some possible implementations, the one or more server devices may further receive the search query; identify the particular webpage as being relevant to the search query; generate the search result document, where the search result document may include the snippet generated for the particular webpage; and provide the search result document as a response to the search query.

In some possible implementations, the one or more server devices, when processing the identified sub-pages to select the set of sub-pages, may determine that one of the set of sub-pages is linked to by the particular webpage, determine a measure of quality of the one of the set of sub-pages, determine a length of the title for the one of the set of sub-pages, determine that the title, for the one of the set of sub-pages, lacks one or more particular characters, and select the one of the set of sub-pages to use to generate the snippet based on: the one of the set of sub-pages being linked to by the particular webpage, the measure of quality, of the one of the set of sub-pages, satisfying a first threshold, the length of the title, for the one of the set of sub-pages, satisfying a second threshold, and the title, for the one of the set of sub-pages, lacking the one or more particular characters.

In some possible implementations, a computer-readable medium may store instructions. The instructions may include a set of instructions which, when executed by one or more processors, cause the one or more processors to: identify sub-pages corresponding to a particular webpage, where the particular webpage and the identified sub-pages may be associated with a same website; determine titles for the identified sub-pages; process the identified sub-pages to select a set of sub-pages, of the identified sub-pages, to use to generate a snippet for the particular webpage, where each of the set of sub-pages may satisfy particular criteria, and a quantity of the set of sub-pages may be based on a length of a concatenation of the titles for the set of sub-pages; generate the snippet, for the particular webpage, using the titles for the set of sub-pages; and store the generated snippet in association with the particular webpage, where the generated snippet may be presented in a search result document when the particular webpage is identified as being relevant to a search query.

In some possible implementations, one or more instructions, of the set of instructions, to process the identified sub-pages to select the set of sub-pages may include one or more instructions which, when executed by the one or more processors, cause the one or more processors to determine that one of the set of sub-pages is linked to by the particular webpage, and select the one of the set of sub-pages to use to generate the snippet based on the one of the set of sub-pages being linked to by the particular webpage.

In some possible implementations, one or more instructions, of the set of instructions, to process the identified sub-pages to select the set of sub-pages may include one or more instructions which, when executed by the one or more processors, cause the one or more processors to determine a length of the title for one of the set of sub-pages, determine that the length of the title, for the one of the set of sub-pages, satisfies a threshold, and select the one of the set of sub-pages to use to generate the snippet based on the length of the title, for the one of the set of sub-pages, satisfying the threshold.

In some possible implementations, one or more instructions, of the set of instructions, to process the identified sub-pages to select the set of sub-pages may include one or more instructions which, when executed by the one or more processors, cause the one or more processors to determine a first length of the title for one of the set of sub-pages; determine a second length of one or more of the titles of one or more of the set of sub-pages, where the one or more of the set of sub-pages may be different from the one of the set of sub-pages; determine a total length based on a sum of the first length and the second length; determine that the total length satisfies a threshold, and select the one of the set of sub-pages to use to generate the snippet based on the total length satisfying the threshold.

In some possible implementations, one or more instructions, of the set of instructions, to identify the sub-pages may include one or more instructions which, when executed by the one or more processors, cause the one or more processors to determine the sub-pages based on a link structure or a website hierarchy of the website, where the sub-pages may be determined based on positions of the sub-pages, relative to the particular webpage, in the link structure or the website hierarchy.

In some possible implementations, one or more instructions, of the set of instructions, to process the identified sub-pages to select the set of sub-pages may include one or more instructions which, when executed by the one or more processors, cause the one or more processors to determine that one of the set of sub-pages is linked to by the particular webpage, determine a measure of quality of the one of the set of sub-pages, determine a length of the title for the one of the set of sub-pages, determine that the title, for the one of the set of sub-pages, lacks one or more particular characters, and select the one of the set of sub-pages to use to generate the snippet based on: the one of the set of sub-pages being linked to by the particular webpage, the measure of quality, of the one of the set of sub-pages, satisfying a first threshold, the length of the title, for the one of the set of sub-pages, satisfying a second threshold, and the title, for the one of the set of sub-pages, lacking the one or more particular characters.

In some possible implementations, a system may include means for identifying sub-pages corresponding to a particular webpage, where the particular webpage and the identified sub-pages may be associated with a same website; means for determining titles for the identified sub-pages; means for processing the identified sub-pages to select a set of sub-pages, of the identified sub-pages, to use to generate a snippet for the particular webpage, where each of the set of sub-pages may satisfy particular criteria, and a quantity of the set of sub-pages may be based on a length of a concatenation of the titles for the set of sub-pages; means for generating the snippet, for the particular webpage, using the titles for the set of sub-pages; and means for storing the generated snippet in association with the particular webpage, where the generated snippet may be presented in a search result document when the particular webpage is identified as being relevant to a search query.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

In some implementations, a snippet may be provided, as part of a search result document that provides a link to a webpage, in which the snippet for the webpage is synthesized from text that is associated with sub-pages for the webpage. This type of snippet may be referred to as a synthesized snippet herein. In some implementations, a comparison may be made between a synthesized snippet, for a webpage, and a normal snippet, such as a snippet based on text from the webpage, to determine whether to provide the normal snippet or the synthesized snippet in the search result document. A snippet, as the term is used herein, may refer to a short description of a webpage. A snippet is commonly presented as part of search results from a search engine, such as a web search engine.

Synthesized snippets may be generated based on the content of sub-pages, for the webpage, that is described by the synthesized snippet. In some implementations, a sub-page is a webpage that is part of the same website as the webpage that is described by the synthesized snippet and is directly or indirectly linked to by the webpage that is described by the synthesized snippet. Alternatively, or additionally, a sub-page can be from a different website or can be part of the same website but not directly or indirectly linked to by the webpage.

As used herein, information relating to sub-pages of a webpage may be obtained from or correspond to shortcut links for the webpage. Shortcut links, an example of which may include sitelinks, may include links, presented as part of search results, that may be used to present a user with shortcuts to other webpages, associated with the same webpage, that may be related to a search result. For example, the first search result in a search result document may reference a webpage about a certain software application. Shortcut links may be provided, as part of the first search result, as links to other webpages, such as a webpage via which a user may download the software application or a webpage that includes frequently asked questions about the software application. These webpages, included as shortcut links, may generally be webpages that are associated with the same website as the main webpage. Shortcut links for a webpage may be determined automatically based on the analysis of the link structure for a website.

Figure 1:
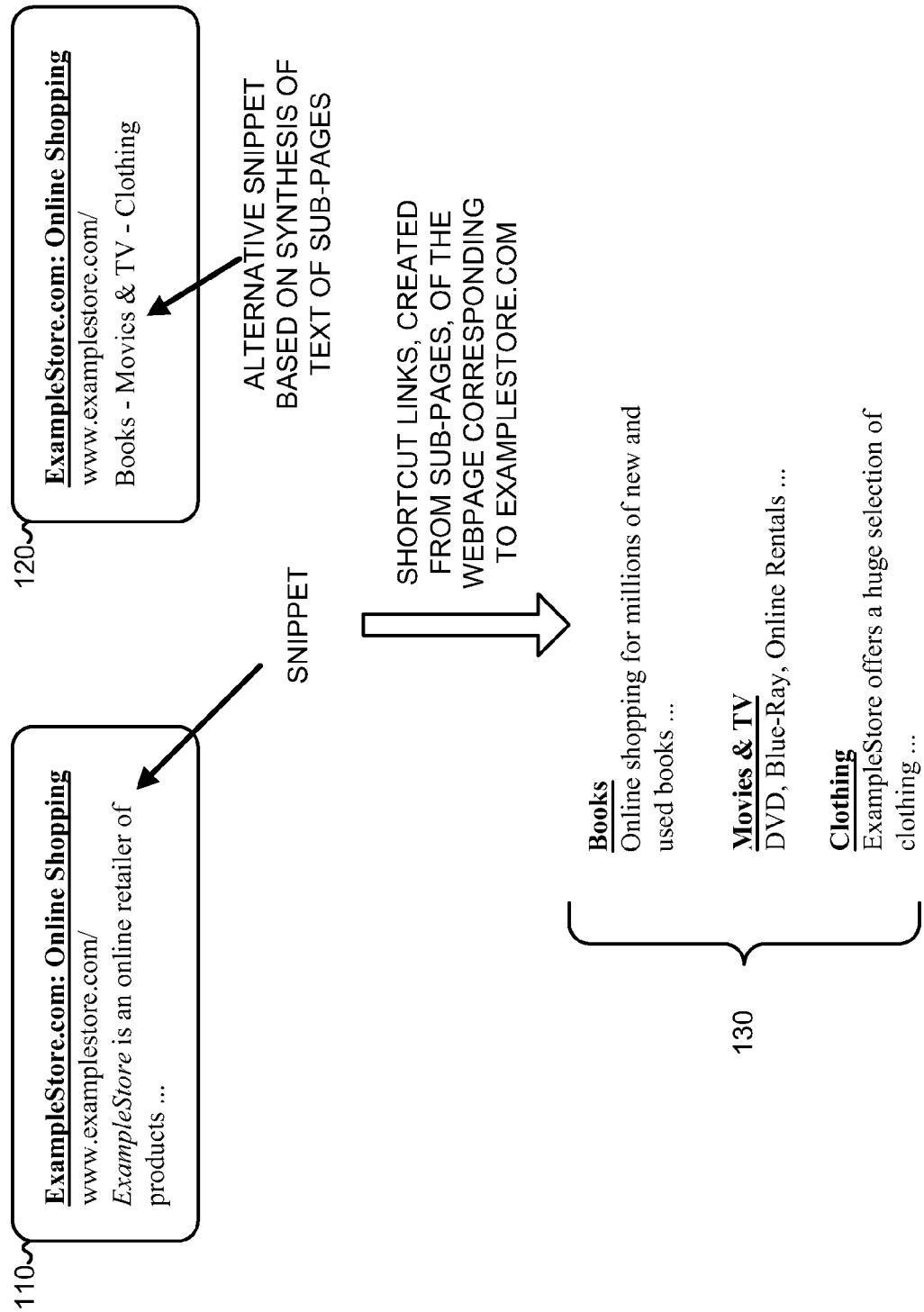
FIG. 1 is a diagram illustrating an overview of an implementation described herein.

FIG. 1 is a diagram illustrating an overview of an implementation described herein. In the example of FIG. 1, assume that the user entered the search query "examplestore," which may be a search query that is intended as a navigational query to take the user to the website for "examplestore.com." The top result may be the homepage for the website "examplestore.com." Two example search results, providing the top result, i.e., a reference to the webpage "examplestore.com," are illustrated in FIG. 1 as search result 110 and search result 120. The webpage "examplestore.com" may be associated with a number of shortcut links 130, such as shortcut links that were determined based on a link analysis of the website of "examplestore.com." Each shortcut link 130 may include a title and a snippet relating to a sub-page of examplestore.com. Although not shown in FIG. 1, in some implementations, the shortcut links may be included as part of search results 110 and/or 120.

For both of search results 110 and 120, a snippet may be provided that provides additional information describing the webpage associated with "examplestore.com." For search result 110, the snippet may be a snippet that was determined based on the text of the webpage. For search result 120, the snippet may be a synthesized snippet that was determined by concatenating the title text of shortcut links 130.

In some situations, the synthesized snippet, of search result 120, may provide a more informative and/or useful snippet than the snippet of search result 110. In the illustrated example, for instance, the snippet for search result 110, "ExampleStore is an online retailer of products . . . ," may provide relatively little additional information to that which is provided in the title of search result 110. In contrast, the synthesized snippet may provide additional information that is more likely to be valuable to the user. Thus, in this example, it may be desirable for a search engine to provide the synthesized snippet, as part of a search result in a search result document, rather than the normal snippet.

While the description to follow will refer to webpages, the concepts described herein may be applied to documents. A document may be broadly interpreted to include any machine-readable and machine-storable work product. A document may include, for example, an e-mail, a website, a file, a combination of files, one or more files with embedded links to other files, a news group posting, a news article, a blog, a business listing, an electronic version of printed text, a web advertisement, etc. In the context of the Internet, a common document is a webpage. Documents often include textual information and may include embedded information, such as meta information, images, hyperlinks, etc., and/or embedded instructions, such as Javascript, etc. A link, as the term is used herein, is to be broadly interpreted to include any reference to a document from another document or another part of the same document.

A website, as the term is used herein, may refer to a collection of related webpages. Frequently, a website may be associated with a single domain, although some websites may potentially encompass more than one domain.

Figure 2:
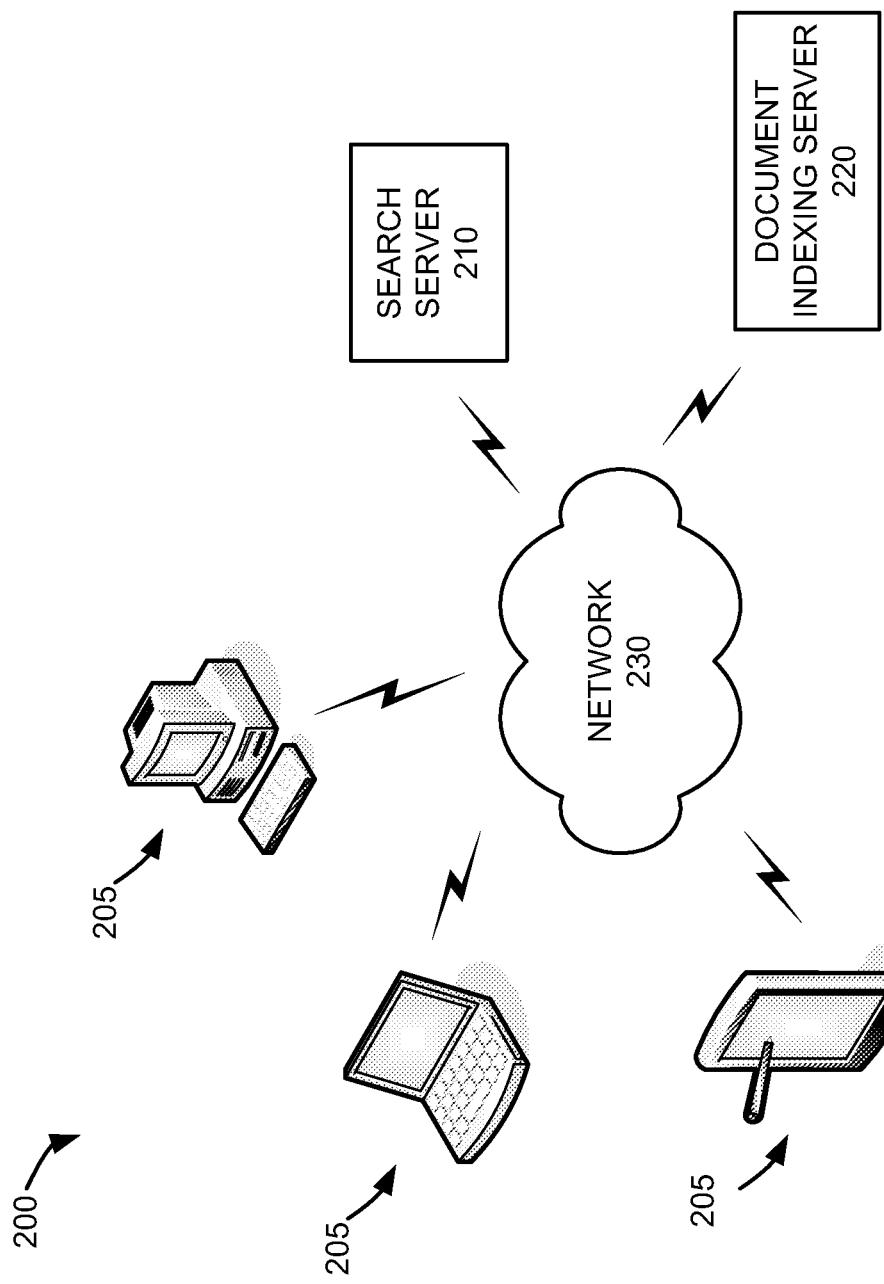
FIG. 2 is a diagram of an example environment in which techniques described herein may be implemented.

FIG. 2 is a diagram of an example environment 200 in which techniques described herein may be implemented. Environment 200 may include multiple clients 205 connected to one or more servers 210-220 via a network 230. In some implementations, and as illustrated, server 210 may be a search server, which may implement a search engine, and server 220 may be a document indexing server, e.g., a web crawler and/or indexer. Clients 205 and servers 210-220 may connect to network 230 via wired connections, wireless connections, or a combination of wired and wireless connections.

Three clients 205 and two servers 210-220 are illustrated as connected to network 230 for simplicity. In practice, there may be additional or fewer clients and/or servers. Also, in some instances, a client may perform one or more functions of a server, and a server may perform one or more functions of a client.

Clients 205 may include devices of users that access servers 210-220. A client 205 may include, for instance, a personal computer, a wireless telephone, a personal digital assistant (PDA), a laptop, a smartphone, a tablet computer, or another type of computation or communication device. Servers 210-220 may include devices that access, fetch, aggregate, process, search, provide, and/or maintain documents. Although shown as single servers 210 and 220 in FIG. 2, each server 210 and 220 may, in some implementations, be implemented as multiple computing devices, which potentially may be geographically distributed.

Search server 210 may include one or more computing devices designed to implement a search engine, such as an image search engine, a general webpage search engine, a product search engine, a local search engine, etc. Search server 210 may, for example, include one or more web servers to receive search queries from clients 205, search one or more memories to identify documents relevant to the search queries, and provide a search result document, containing links to the documents, to clients 205.

Document indexing server 220 may include one or more computing devices designed to index documents available through network 230. Document indexing server 220 may access other servers, such as web servers that host content, to index the content. Document indexing server 220 may provide its index to search server 210, for use by search server 210 when processing search queries.

While servers 210-220 are shown as separate entities, servers 210-220 may perform one or more of the functions of the other one of servers 210-220. In some implementations, servers 210 and 220 may be implemented as a single server. In some implementations, a single one of servers 210 and 220 may be implemented as two or more separate, and possibly distributed, devices.

Network 230 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks.

Although FIG. 2 shows example components of environment 200, in some implementations, environment 200 may contain fewer components, different components, differently arranged components, or additional components than those depicted in FIG. 2. Alternatively, or additionally, one or more components of environment 200 may perform one or more other tasks described as being performed by one or more other components of environment 200.

Figure 3:
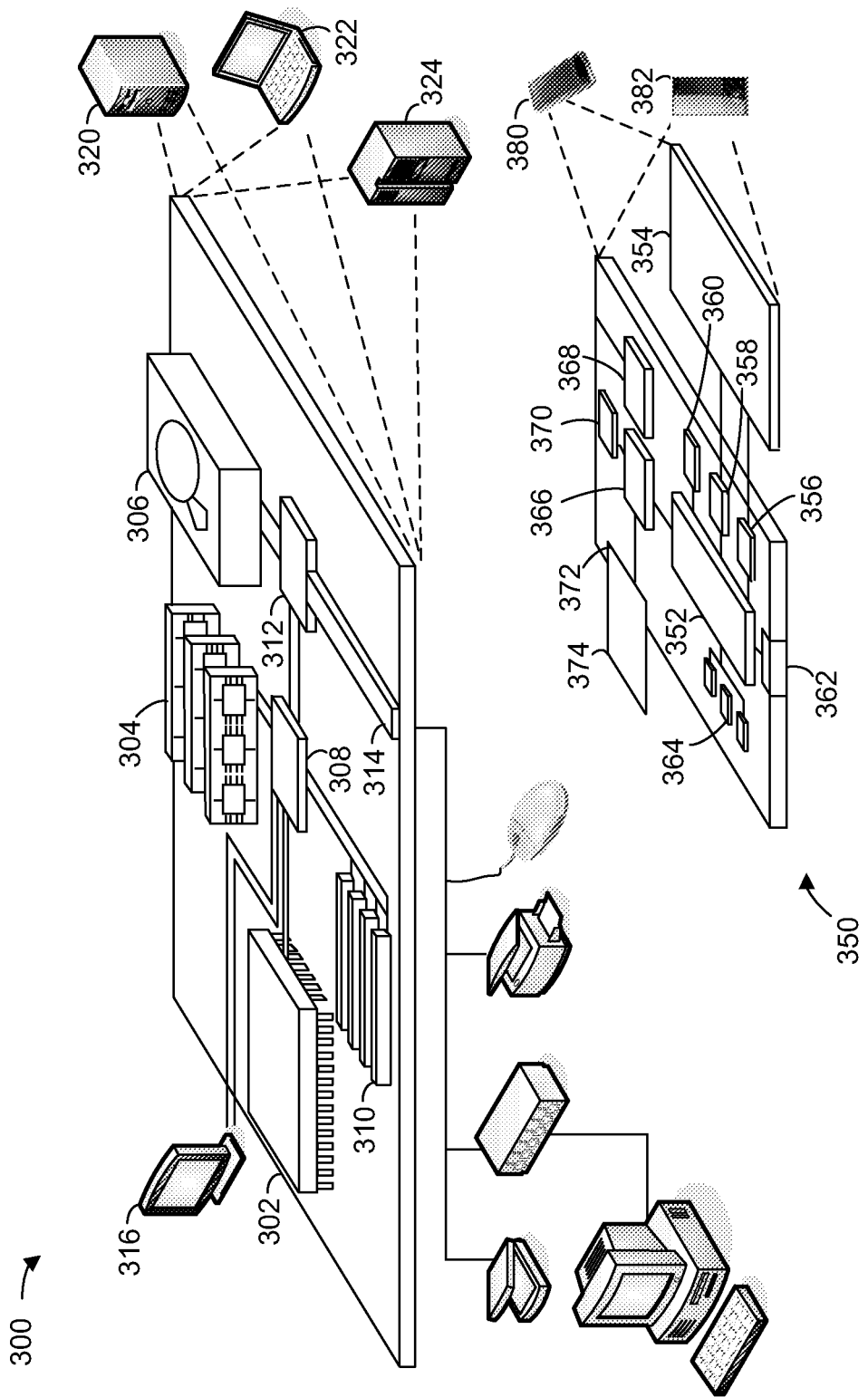
FIG. 3 shows an example of a generic computing device and a generic mobile computing device, which may be used with the techniques described herein.

FIG. 3 shows an example of a generic computing device 300 and a generic mobile computing device 350, which may be used with the techniques described herein. Computing device 300 may correspond to, for example, client 205 and/or server 210 and/or 220. For example, each of clients 205 and servers 210 and/or 220 may include one or more computing devices 300. Mobile computing device 350 may correspond to, for example, portable implementations of clients 205.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, may be interconnected using various busses, and may be mounted on a common motherboard or in other manners as appropriate. Processor 302 may process instructions for execution within computing device 300, including instructions stored in the memory 304 or on storage device 306 to display graphical information for a graphical user interface (GUI) on an external input/output device, such as display 316 coupled to high speed interface 308. In some implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system, etc.

Memory 304 may store information within computing device 300. In some implementations, memory 304 may include a volatile memory unit or units. In some implementations, memory 304 may include a non-volatile memory unit or units. Memory 304 may also be another form of computer-readable medium, such as a magnetic or optical disk. A computer-readable medium may be defined as a non-transitory memory device. A memory device may include memory space within a single physical storage device or memory space spread across multiple physical storage devices.

Storage device 306 may provide mass storage for computing device 300. In some implementations, storage device 306 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 304, storage device 306, or memory included within processor 302.

High speed controller 308 may manage bandwidth-intensive operations for computing device 300, while low speed controller 312 may manage lower bandwidth-intensive operations. Such allocation of functions is an example only.

In some implementations, high-speed controller 308 may be coupled to memory 304, display 316, e.g., through a graphics processor or accelerator, and to high-speed expansion ports 310, which may accept various expansion cards (not shown). In these implementations, low-speed controller 312 may be coupled to storage device 306 and to low-speed expansion port 314. Low-speed expansion port 314, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

Computing device 300 may be implemented in a number of different forms, as shown in FIG. 3. For example, it may be implemented as a standard server 320, or multiple times in a group of such servers. It may also be implemented as part of a rack server system 324. Additionally or alternatively, computing device 300 may be implemented in a personal computer, such as a laptop computer 322. Additionally or alternatively, components from computing device 300 may be combined with other components in a mobile device (not shown), such as mobile computing device 350. Each of such devices may contain one or more of computing device 300, mobile computing device 350, and/or an entire system may be made up of multiple computing devices 300 and/or mobile computing devices 350 communicating with each other.

Mobile computing device 350 may include a processor 352, a memory 364, an input/output (I/O) device such as a display 354, a communication interface 366, and a transceiver 368, among other components. Mobile computing device 350 may also be provided with a storage device, such as a microdrive or other device (not shown), to provide additional storage. Each of components 350, 352, 364, 354, 366, and 368, may be interconnected using various buses, and several of the components may be mounted on a common motherboard or in other manners as appropriate.

Processor 352 may execute instructions within mobile computing device 350, including instructions stored in memory 364. Processor 352 may be implemented as a set of chips that may include separate and multiple analog and/or digital processors. Processor 352 may provide, for example, for coordination of the other components of mobile computing device 350, such as, for example, control of user interfaces, applications run by mobile computing device 350, and/or wireless communication by mobile computing device 350.

Processor 352 may communicate with a user through control interface 358 and a display interface 356 coupled to a display 354. Display 354 may include, for example, a TFT Thin-Film-Transistor Liquid Crystal Display (TFT LCD), an Organic Light Emitting Diode (OLED) display, and/or other appropriate display technology. Display interface 356 may comprise appropriate circuitry for driving display 354 to present graphical and other information to a user. Control interface 358 may receive commands from a user and convert them for submission to processor 352. In addition, an external interface 362 may be in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 may store information within mobile computing device 350. Memory 364 can be implemented as one or more of a computer-readable medium or media, a volatile memory unit or units, or a non-volatile memory unit or units. Expansion memory 374 may also be provided and connected to mobile communication device 350 through expansion interface 372, which may include, for example, a SIMM (Single In Line Memory Module) card interface. Such expansion memory 374 may provide extra storage space for mobile computing device 350, or may also store applications or other information for mobile computing device 350. Specifically, expansion memory 374 may include instructions to carry out or supplement the processes described above, and may also include secure information. Thus, for example, expansion memory 374 may be provided as a security module for mobile computing device 350, and may be programmed with instructions that permit secure use of mobile computing device 350. In addition, secure applications may be provided via SIMM cards, along with additional information, such as placing identifying information on a SIMM card in a non-hackable manner.

Memory 364 and/or expansion memory 374 may include, for example, flash memory and/or NVRAM memory, as discussed below. In some implementations, a computer program product may be tangibly embodied in an information carrier. The computer program product may store instructions that, when executed, perform one or more methods, such as those described herein. The information carrier may correspond to a computer- or machine-readable medium, such as the memory 364, expansion memory 374, or memory included within processor 352, that may be received, for example, over transceiver 368 or over external interface 362.

Mobile computing device 350 may communicate wirelessly through a communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, a Global Positioning System (GPS) receiver module 370 may provide additional navigation- and location-related wireless data to mobile computing device 350, which may be used as appropriate by applications running on mobile computing device 350.

Mobile computing device 350 may also communicate audibly using an audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in FIG. 3. For example, it may be implemented as a cellular telephone 380. It may also be implemented as part of a smart phone 382, a personal digital assistant (not shown), and/or other similar mobile device.

Various implementations of the systems and techniques described herein may be realized in digital electronic circuitry, integrated circuitry, specially designed application specific integrated circuits (ASICs), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and may be implemented in a high-level procedural and/or object-oriented programming language, and/or in assembly/machine language. As used herein, the terms "machine-readable medium" and "computer-readable medium" may refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and techniques described herein may be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the systems may be interconnected by any form or medium of digital data communication (e.g., a communication network). Examples of communication networks include a local area network ("LAN"), a wide area network ("WAN"), and the Internet.

Although FIG. 3 shows example components of computing device 300 and mobile computing device 350, computing device 300 or mobile computing device 350 may include fewer components, different components, additional components, or differently arranged components than depicted in FIG. 3. Additionally or alternatively, one or more components of computing device 300 or mobile computing device 350 may perform one or more tasks described as being performed by one or more other components of computing device 300 or mobile computing device 350.

Synthesized snippets, for a webpage, may be generated based on information obtained from sub-pages of the webpage. The sub-pages for the webpage may be determined based on a link analysis of the webpage. In some implementations, the sub-pages of a first webpage may include webpages that are directly or indirectly linked to by the first webpage and that are part of the same website as the first webpage. The sub-pages of the first webpage may also include webpages that may not necessarily be linked by traditional links. For example, a directory analysis, for example based on the strings of the uniform resource locators (URLs) of a webpage, may be performed to determine sub-pages. For example, "examplestore/books/fiction" begins with "examplestore/books," indicating that the fiction webpage may be a sub-page of the Books webpage. As another example, so-called "breadcrumb" links on a webpage may be used to determine sub-pages. A breadcrumb may refer to a navigation aid that may be presented by webpages to provide a user with an indication of their location in a website (e.g., a user browsing the fiction section of an online bookstore may be provided the breadcrumb "books>fiction"). The breadcrumbs may be parsed to determine link structures that may be used to define sub-pages.

Figure 4:
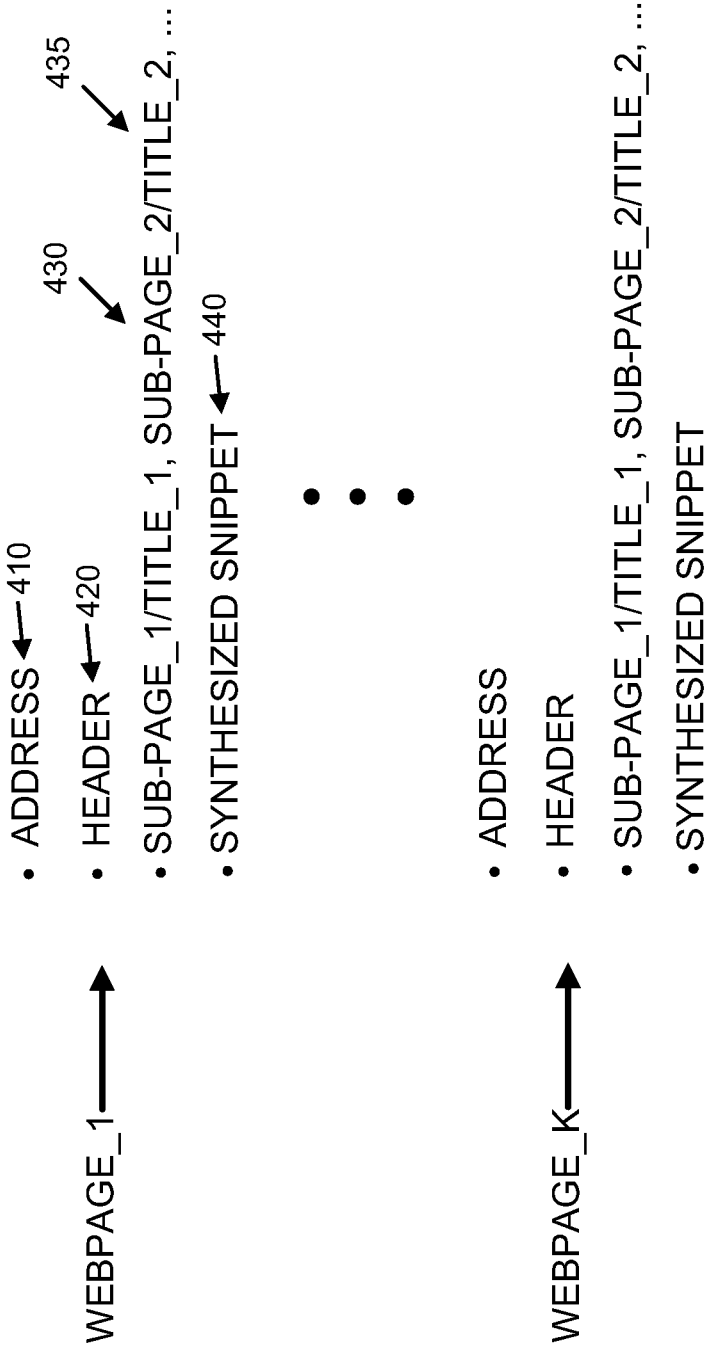
FIG. 4 is a diagram illustrating information that may be stored for webpages.

FIG. 4 is a diagram illustrating information that may be stored for webpages. The information may be obtained and/or generated by search server 210 and/or document indexing server 220. For example, webpages hosted by web servers connected to network 230 may be crawled by document indexing server 220. A number of webpages, illustrated as webpage_1 through webpage_k, are illustrated in FIG. 4. An address 410, a header 420, one or more sub-pages 430 and corresponding sub-page titles 435, and a synthesized snippet 440 may be associated with each webpage.

Address 410 may be a URL or a uniform resource identifier (URI) and may be stored for each webpage. Addresses 410 may be obtained as part of the crawling process by document indexing server 220.

Header 420 may also be associated with each webpage. In some implementations, header 420 may include text extracted from the webpage and/or text extracted from other sources. The text may serve as a brief description or title for the webpage. In some implementations, header 420 may correspond to anchor text that is used as a title, corresponding to the webpage, in search results that include that webpage. A number of techniques may be used to extract a header 420 for a webpage. For example, text that is near the top of the webpage or text that is formatted to be prominently presented, such as header text in a hypertext markup language (HTML) document, may be selected as a header 420 for the webpage.

Sub-pages 430/titles 435 may include sub-pages and titles that are determined to be relevant to the webpage. As previously mentioned, sub-pages 430, for a webpage, may be determined based on a link analysis of the webpage. In some implementations, each sub-page 430 may correspond to a webpage that is determined to be a potential shortcut link for a parent webpage. A shortcut link, as described previously, may include links, presented as part of search results, that may be used to present a user with shortcuts to other webpages. Titles 435 may include descriptive text, which may be determined based on text or other information associated with sub-pages 430. Titles 435 may be chosen as relatively short, e.g., less than 30 or 40 characters, descriptors for a webpage. In some implementations, each title 435 may correspond to the header 420 of the sub-page 430. That is, each sub-page 430 may also be an indexed webpage that may, thus, have a corresponding header 420 that may be used as the title 435 for the sub-page 430.

Not all webpages may be associated with sub-pages. For example, in some implementations, only top-level webpages of a website may be candidates for shortcut links and/or sub-pages. For instance, only the homepage and webpages within a particular number of links of the homepage may be a shortcut link/sub-page candidate. In some implementations, additional factors, such as a quality score, for example, a query-independent quality score, associated with a webpage or user traffic to the webpage, may be considered when determining whether a webpage is a shortcut link and/or sub-page candidate. For example, in some implementations, only webpages with quality scores or user traffic to the webpages satisfying a particular threshold may be used as shortcut link and/or sub-page candidates.

Synthesized snippet 440 may include descriptive text that is based on the sub-pages 430/titles 435 of the webpage. The descriptive text may be generated based on the titles in sub-pages 430/titles 435. In some implementations, synthesized snippet 440 may be dynamically generated in response to a search query. In this situation, synthesized snippet 440 may not necessarily be stored ahead of time (e.g., prior to receiving the search query). In some implementations, synthesized snippets 440 may be generated and stored ahead of time. The creation and usage of synthesized snippet 440 will be described in more detail below.

The information shown in FIG. 4, for each of a number of webpages, provides one example of fields that may be stored or generated for a webpage. In some implementations, fewer or additional fields may be generated or stored. For example, scores used to represent the quality of a webpage or sub-page may additionally be generated and stored.

Figure 5:
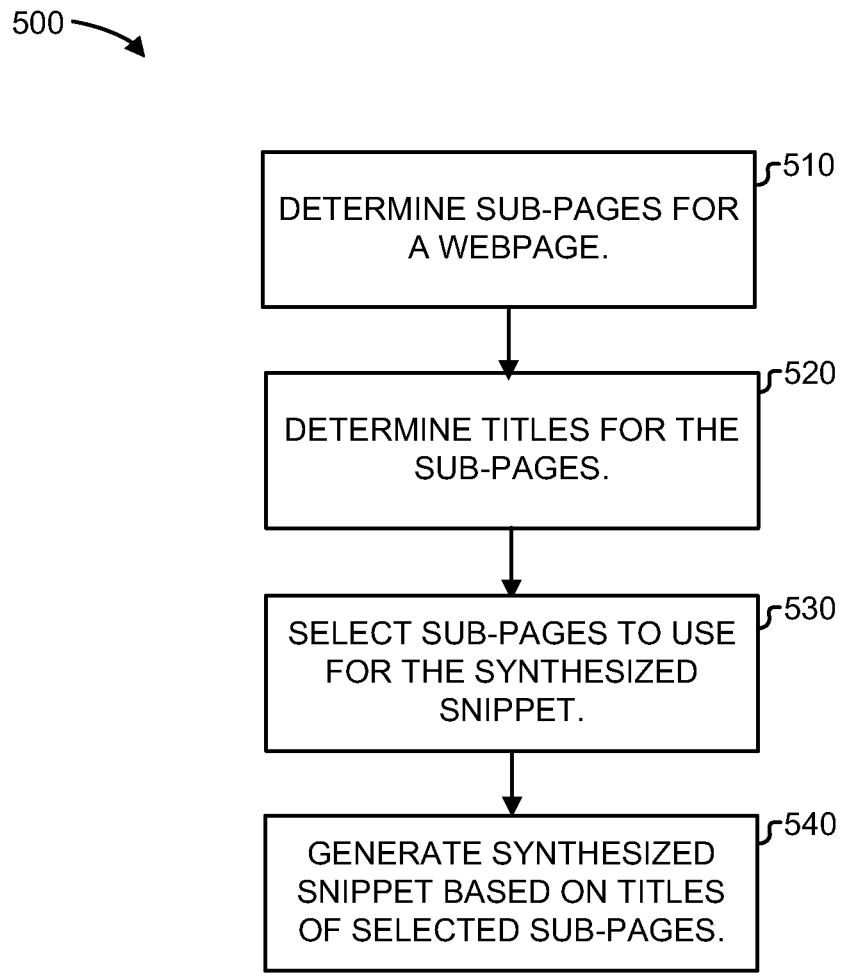
FIG. 5 is a flowchart of an example process for generating a synthesized snippet.

FIG. 5 is a flowchart of an example process 500 for generating a synthesized snippet. Process 500 may be performed by, for example, search server 210 and/or document indexing server 220.

Process 500 includes determining the sub-pages for a webpage (block 510). In some implementations, the sub-pages may be determined automatically based on analysis of the link structure of the webpage or a website containing the webpage. For example, webpages, that are directly or indirectly linked to by a first webpage and that are part of the same website as the first webpage, may be determined to be sub-pages. As another example, webpages, that are part of the same website as the first webpage and that are below the first webpage in a website hierarchy, as determined by the URLs of the webpages, may be candidates to be sub-pages. As another example, webmasters may be given the ability to indicate which webpages should be classified as sub-pages.

In some possible implementations, instead of determining sub-pages for a webpage based on the link structure of a website, other structural information in the webpage may be used to determine the sub-pages. For example, for a webpage that includes prominently defined internal links to the webpage itself, such as a single webpage with a table of contents section that is used to internally define breaks in the webpage, the sub-pages may be defined as different sections within the webpage. Alternatively, the webpage may include prominent section headings but may not necessarily include internal links. In this situation, the section headings may be used to determine the sub-pages within the webpage.

In some situations, a search server 210 may, for some search result documents, provide shortcut links as part of one or more of the search results in the search result documents. Webpages that are selected as possible shortcut links may also be used as sub-pages for purposes of determining synthesized snippets. In this case, the processing done to determine the potential shortcut links may be leveraged for the determination of the subpages for the webpage.

Process 500 further includes determining titles for the sub-pages (block 520), for example, as described above with respect to FIG. 4.

Process 500 further includes selecting sub-pages to use for the synthesized snippet (block 530). The sub-pages may be selected from the set of sub-pages determined in block 510. In some implementations, the sub-pages may be selected based on parameters associated with the sub-pages, such as quality scores associated with the sub-pages. For example, a particular quantity of the sub-pages with the highest quality scores may be selected. As another example, the sub-pages may be selected as sub-pages that are associated with quality scores above a particular threshold. As another example, titles of the sub-pages may be used in selecting sub-pages. For example, in addition to selecting titles based on the quality scores of the sub-pages, other factors may be considered, such as whether the titles would be effective in a snippet. For example, if a title is too long and is not easily truncated, the sub-page may not be selected even if the quality score is high. As another example, the quantity of sub-pages to be selected may be determined based on a desired length of the synthesized snippet.

Process 500 further includes generating a synthesized snippet based on the titles of the selected sub-pages (block 540). In some implementations, the titles, corresponding to the selected sub-pages, may be concatenated to generate the synthesized snippet. For example, in some implementations, the sub-pages may be ranked, for example, based on their quality scores or user traffic, and the titles for the sub-pages are concatenated according to the order of the sub-pages. In other possible implementations, other techniques may be used to generate a synthesized snippet based on the selected sub-pages. One particular example of a technique that may be used to implement blocks 530 and 540 will be described next.

As a more detailed description of one example of a technique that may be used to implement blocks 530 and 540, to generate a synthesized snippet, consider a technique in which each of the titles, for sub-pages corresponding to a particular webpage, are sequentially processed from highest quality score to lowest quality score of the sub-pages. A title may be selected when the corresponding sub-page satisfies the criteria: (1) the sub-page is directly linked to by the webpage; (2) a quality score of the corresponding sub-page is greater than a first threshold; (3) the sub-page has a title length less than a second threshold, e.g., 20 or 30 characters; (4) the title of the sub-page does not contain certain characters such as commas, dashes, or periods; and (5) the length of the title, when added to the total length of the previously selected titles, results in a total length less than a third threshold. Criteria (1)-(5) represent one example of a technique that can be used to generate a synthesized snippet. Other techniques could alternatively or additionally be used and/or one or more of criteria (1)-(5) can be omitted or modified. For example, criteria (3) may be helpful but not strictly necessary. For instance, the title may be truncated if the other criteria indicate that the title for the sub-page should be selected. As another example, for criteria (1), a sub-page may additionally be connected to the webpage through breadcrumb links or string analysis of URLs.

Figure 6:
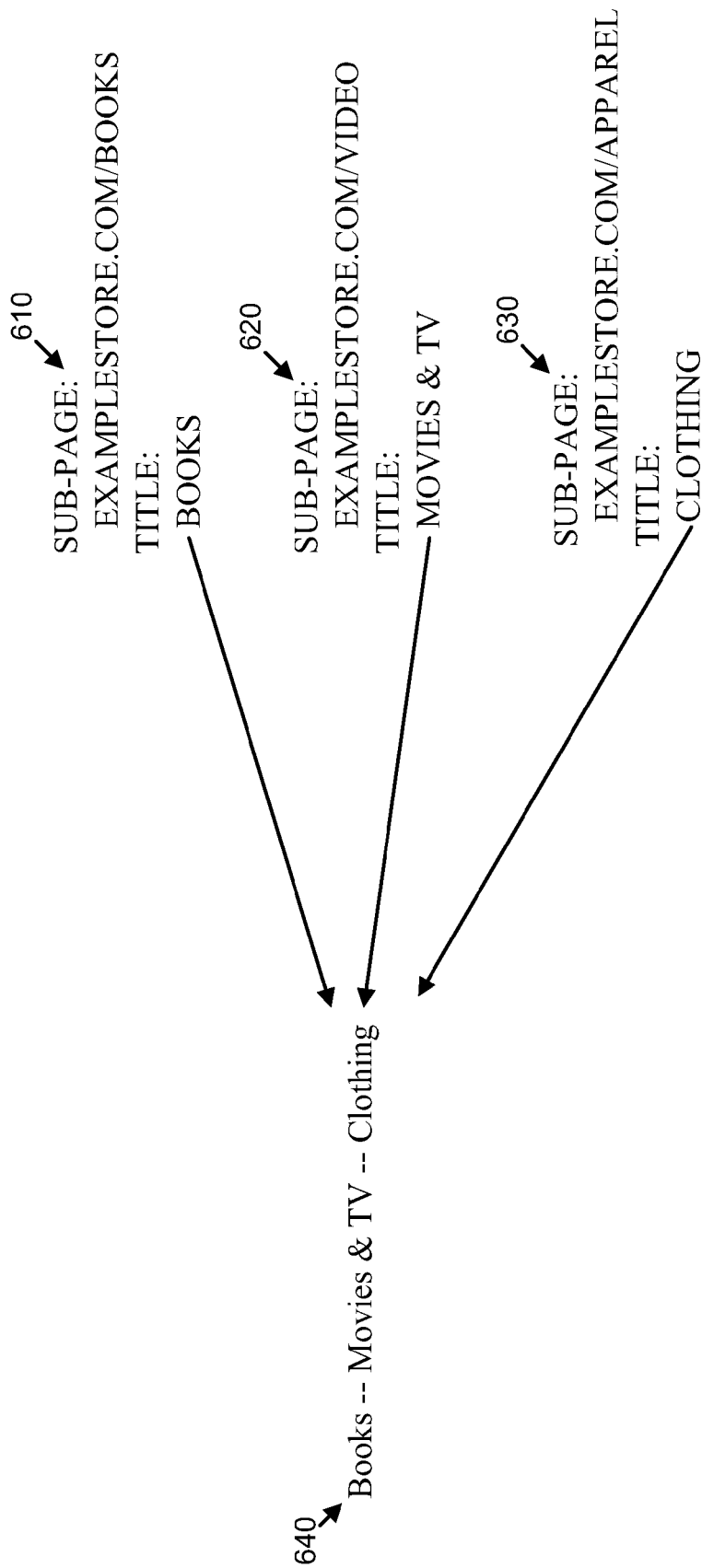
FIG. 6 is a diagram conceptually illustrating generation of a synthesized snippet by concatenating the titles of a number of sub-pages.

FIG. 6 is a diagram conceptually illustrating generation of a synthesized snippet by concatenating the titles of a number of sub-pages. In this example, assume that three sub-pages, labeled as sub-pages 610, 620, and 630, are selected to be used to generate synthesized snippet 640. Sub-page 610 is associated with the title "Books," sub-page 620 is associated with the title "Movies & TV," and sub-page 630 is associated with the title "Clothing." Synthesized snippet 640 may include a concatenation of the three titles: "Books—Movies & TV—Clothing."

Figure 7:
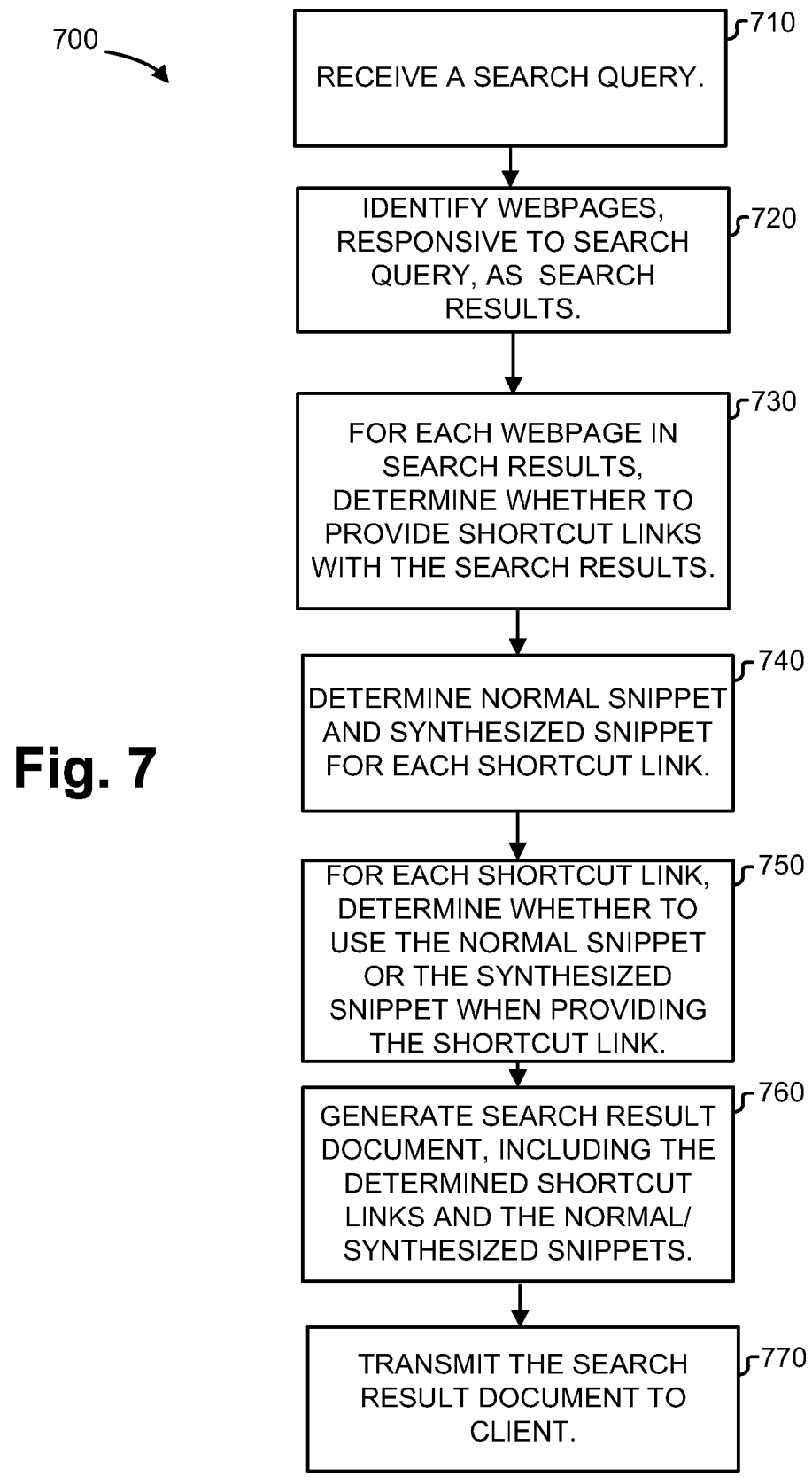
FIG. 7 is a flowchart of an example process for using synthesized snippets in search results that include shortcut links.

FIG. 7 is a flowchart of an example process 700 for using synthesized snippets in search results that include shortcut links. Process 700 may be performed by, for example, search server 210.

Process 700 includes receiving a search query (block 710). The search query may be received from a client 205, and may be, for example, a search query relating to a general web search, a news search, an image search, or another type of search.

Process 700 further includes identifying webpages, responsive to the search query, as search results (block 720). The webpages may be identified by a search engine using a search algorithm. The webpages may be documents that are determined to be relevant to the search query.

Process 700 further includes, for each webpage included in the search results, determining whether to provide shortcut links for the webpage with the search results (block 730). In some implementations, shortcut links may only be provided for certain webpages included in the search results. For example, shortcut links may only be provided if the webpage is determined to be a highly relevant search result, such as a top search result that is determined to likely be the webpage to which the user intends to navigate. Alternatively or additionally, shortcut links may only be provided for webpages that are determined to have a quality score above a particular threshold or that have a relevance score, that measures the relevance of the webpage to the search query, above a particular threshold.

Process 700 further includes determining a normal snippet and a synthesized snippet for each shortcut link that is to be presented as part of the search results (block 740). As previously mentioned, a normal snippet may include a snippet that is based on text extracted from the webpage that is being described by the snippet. The normal snippet may include at least some of the terms of the search query. The synthesized snippet may include a snippet that was generated using a process, such as process 500 (FIG. 5).

Process 700 further includes, for each shortcut link, determining whether to use the normal snippet or the synthesized snippet when providing the shortcut link (block 750). In general, it may be desirable to provide a synthesized snippet, instead of the normal snippet, when the synthesized snippet provides a higher-quality description of the shortcut link webpage than the normal snippet. For example, in some implementations, scores relating the relevance of the normal snippet to the shortcut link webpage and the synthesized snippet to the shortcut link webpage may be calculated, and the synthesized snippet may be provided when the score of the synthesized snippet is greater than the score of the normal snippet. The score of the synthesized snippet may be based on, for example, a number of sub-pages included in the text of the synthesized snippet, the number of candidate sub-pages that could have been used to generate the text of the synthesized snippet, the length of the synthesized snippet, and/or quality scores associated with the sub-pages that were used to form the synthesized snippet. In some implementations, the quality scores, associated with the sub-pages that were used to form the synthesized snippet, may be combined to obtain the score of the synthesized snippet. The score relating the relevance of the normal snippet to the shortcut link webpage may be determined based on, for example, the estimated importance of the terms in the normal snippet in the shortcut link webpage, or other factors.

In some implementations, the type of the normal snippet may be relevant to the determination of whether to provide the normal snippet or the synthesized snippet. For instance, the text of some normal snippets may be based on meta-descriptions that are explicitly indicated by a designer of the webpage. These snippets may be considered to be snippets of type "meta" while other normal snippets, such as snippets generated automatically from text of the corresponding webpage may be considered to be a different type of snippet. In these implementations, the type of the snippet may be stored. In some implementations, snippets based on meta-descriptions may be selected over a synthesized snippet. Additional checks to determine the quality or relevance of the snippet may be performed before selecting the snippet.

Process 700 further includes generating a search result document, including the determined shortcut links and the normal and/or synthesized snippets (block 760). Search server 210 may include links, to the relevant webpages, in the search result document, which may be, for example, an HTML document. In addition to the links to the relevant webpages, the search result document may include other information, such as the determined shortcut links, and, for each of the determined shortcut links, a normal and/or synthesized snippet.

Process 700 further includes transmitting the search result document to the client, such as a client 205 (block 770). Client 205, in response to receiving the search result document, may provide the search result document to the user. For example, a web browser executing at client 205 may render the search result document in a user interface at client 205.

Figure 8:
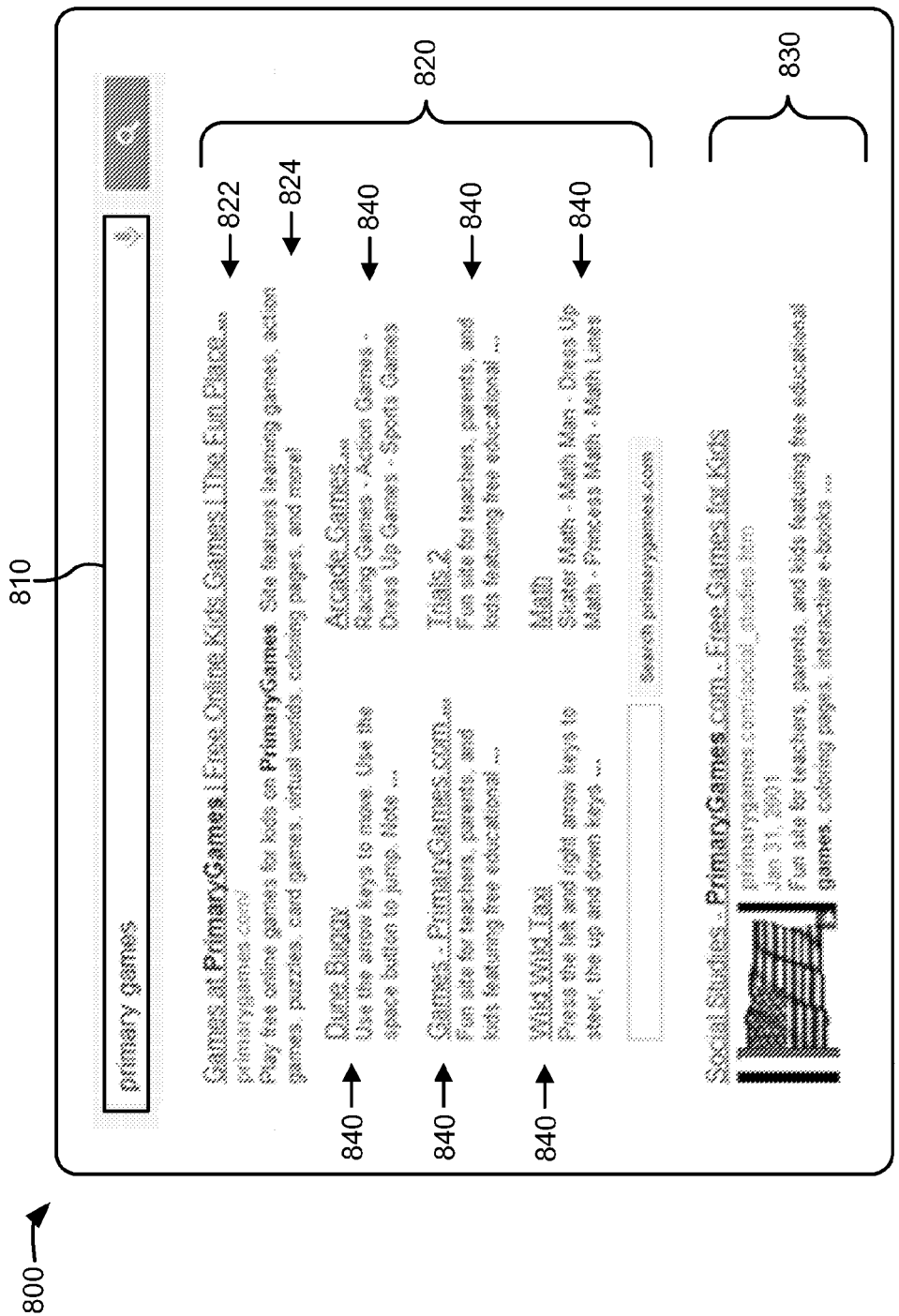
FIG. 8 is a diagram illustrating an example interface that may be provided to a user as part of presentation of a search result document.

FIG. 8 is a diagram illustrating an example interface 800 that may be provided to a user as part of presentation of a search result document formed pursuant to process 700. Interface 800 may be provided, by a browser program executing at a client 205, in response to receiving a search result document from search server 210. Interface 800 may include a search box 810 and search results 820 and 830. Search result 820 may refer to the webpage "primarygames.com" and include a link 822, to "primarygames.com," and a snippet 824 for the webpage referred to by search result 820. Additionally, search result 820 may include a number of shortcut links 840. Each shortcut link 840 may provide a link to a sub-page of the webpage referred to by link 822.

Some of shortcut links 840 may include synthesized snippets while other ones of shortcut links 840 may include normal snippets. For example, as illustrated, the shortcut links 840 labeled "Arcade Games" and "Math" may include snippets that are synthesized snippets, where the terms of the synthesized snippets are based on the titles of sub-pages of the respective shortcut links 840. For instance, assume that the shortcut link "Math" refers to the webpage "primarygames.com/math." Sub-pages of this webpage may include webpages that were deteiiuined to be associated with the titles "Skater Math," "Math Man," "Dress Up Math," "Princess Math," and "Math Lines." The synthesized snippet for this webpage is correspondingly shown as "Skater Math—Math Man—Dress Up Math—Princess Math—Math Lines." Similarly, assume that the shortcut link "Arcade Games" refers to the webpage "primarygames.com/arcade_games." Sub-pages of this webpage may include webpages that were determined to be associated with the titles "Racing Games," "Action Games," "Dress Up Games," and "Sports Games." The synthesized snippet for this webpage is correspondingly shown as "Racing Games—Action Games—Dress Up Games—Sports Games."

A synthesized snippet, as shown in FIG. 8, may provide a higher-quality description of the webpage than a normal snippet. In FIG. 8, for instance, the shortcut links "Games—PrimaryGames.com" and "Trials 2" are provided using normal snippets. In this ease, the normal snippets include the text "fun site for teachers, parents, and kids featuring free educational . . . ," which may be relatively generic text that provides a lower quality description of the underlying webpage than the text of the synthesized snippets.

Figure 9:
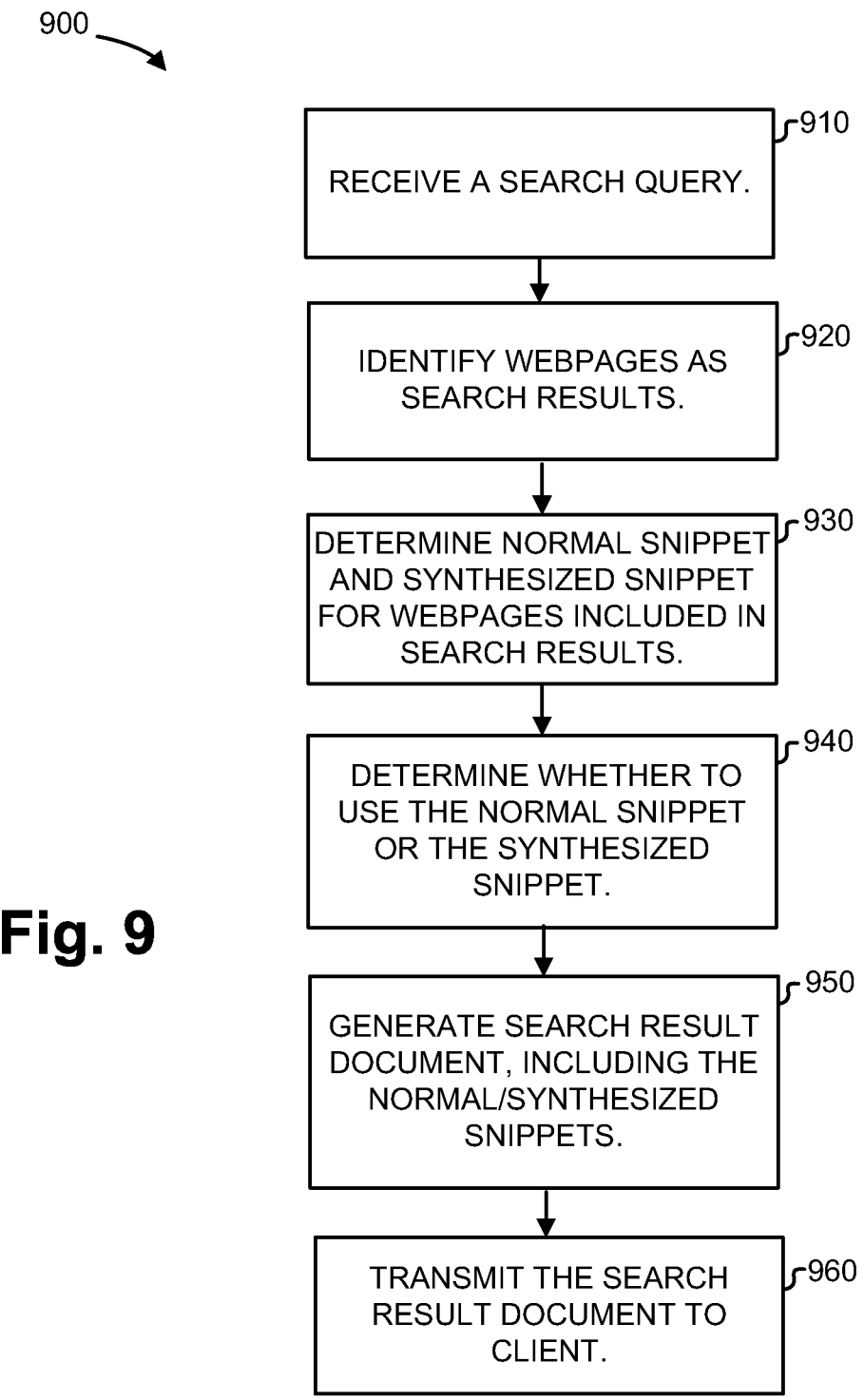
FIG. 9 is a flowchart of an example process for using synthesized snippets in search results.

FIG. 9 is a flowchart of an example process 900 for using synthesized snippets in search results. In contrast to process 700 (FIG. 7), process 900 may provide synthesized snippets in search results that do not necessarily include shortcut links. Process 900 may be performed by, for example, search server 210.

Process 900 includes receiving a search query (block 910). The search query may be received from a client 205, and may be, for example, a search query relating to a general web search, a news search, an image search, or another type of search.

Process 900 further includes identifying webpages as search results (block 920). The webpages may be identified by a search engine using a search algorithm. The webpages may be documents that are determined by the search engine to be relevant to the search query.

Process 900 further includes determining a normal snippet and a synthesized snippet for the webpages included in the search results (block 930). As previously mentioned, a normal snippet may include a snippet that is based on text extracted from the webpage that is being described by the snippet. The normal snippet may include at least some of the terms of the search query in the snippet. The synthesized snippet may include a snippet that is generated pursuant to a process, such as process 500 (FIG. 5).

Process 900 further includes determining whether to use the normal snippet or the synthesized snippet when providing the search results (block 940). The operation of block 940 may be similar to the operations described with respect to block 750 (FIG. 7). In general, it may be desirable to provide a synthesized snippet, instead of the normal snippet, when the synthesized snippet provides a higher-quality description of the webpage than the normal snippet. For example, in some implementations, a score relating the relevance of the normal snippet to the webpage and a score relating the relevance of the synthesized snippet to the webpage may be calculated, and the synthesized snippet may be provided when the score of the synthesized snippet is greater than the score of the normal snippet. The score of the synthesized snippet may be based on, for example, a number of sub-pages included in the text of the synthesized snippet, the number of candidate sub-pages that could have been used to generate the text of the synthesized snippet, the length of the synthesized snippet, and/or quality scores associated with the sub-pages that were used to form the synthesized snippet. The score relating the relevance of the normal snippet to the webpage may be determined based on, for example, the estimated importance of the terms in the normal snippet in the webpage, or other factors.

In some implementations, the type of the normal snippet may be relevant to the determination of whether to provide the normal snippet or the synthesized snippet. For instance, the text of some normal snippets may be based on meta-descriptions that are explicitly indicated by a designer of the webpage. For these snippets, the normal snippet may always be used or may preferentially be used—e.g., the score of the normal snippet may be increased by a particular amount.

Process 900 further includes generating a search result document, including the determined normal and/or synthesized snippets (block 950). Search server 210 may include links, to the relevant webpages, in the search result document. In addition to the links to the relevant webpages, the search result document may include a normal snippet or a synthesized snippet for each of the relevant webpages.

Process 900 furthers include transmitting the search result document to the client, such as client 205 (block 960). Client 205, in response to receiving the search result document, may provide the search result document to the user.

Figure 10:
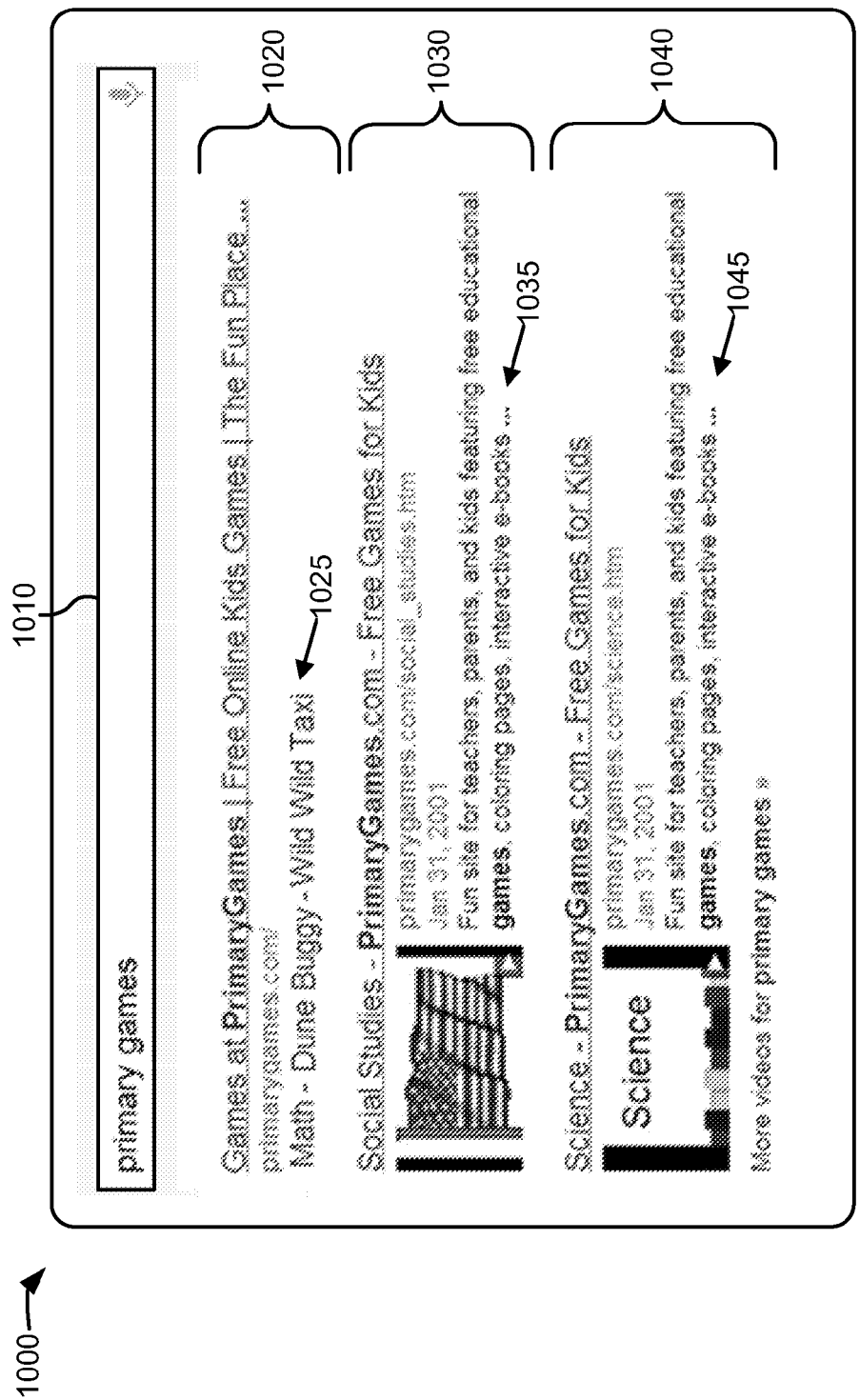
FIG. 10 is a diagram illustrating an example interface that may be provided to a user as part of a search result document.

FIG. 10 is a diagram illustrating an example interface 1000 that may be provided to a user as part of a search result document generated based on process 900. Interface 1000 may be provided, by a browser program executing at a client 205, in response to submission of a search query to search engine 210. Interface 1000 may include a search box 1010 and search results 1020, 1030, and 1040. Search result 1020 may refer to the webpage "primarygames.com" and may include a snippet 1025 that may be a synthesized snippet. Synthesized snippet 1025 may have been generated based on process 500 and may include titles corresponding to sub-pages of the webpage "primarygames.com." As illustrated, the titles of the sub-pages may include "math," "dune buggy," and "wild wild taxi."

Search results 1030 and 1040 may be search results that include normal snippets 1035 and 1045, respectively, that were generated based on text of the corresponding webpages and based on the search query ("primary games").

The user interfaces shown in FIGS. 8 and 10, in which synthesized snippets were provided, are examples of interfaces that may be used. In some implementations, other techniques for presenting the synthesized snippets may be applied. For example, although the synthesized snippets shown in FIGS. 8 and 10 are illustrated as plaintext snippets, each title within a synthesized snippet may be provided as a link to the corresponding sub-page, where the title may be provided as the anchor text of the link. In some possible implementations, a drop-down interface may be used in which a synthesized snippet is shown to the user when the user selects or mouses-over the search result. In some possible implementations, the text of a synthesized snippet may include text that is different or is in addition to the titles of the sub-pages. For instance, the text of a normal snippet can additionally be combined with or used to augment the text of the synthesized snippet.

As described above, a synthesized snippet may be provided as part of a search result, in which the synthesized snippet may be based on text associated with sub-pages, such as shortcut links, that are associated with the webpage of the search result. In some situations, the synthesized snippet may provide a more informative or more descriptive snippet than a normal snippet. As a result, user satisfaction with search results, provided in response to a search query, may increase.

The foregoing description provides illustration and description, but is not intended to be exhaustive or to limit the implementations to the precise form disclosed. Modifications and variations are possible in light of the above disclosure or may be acquired from practice of these implementations.

For example, while series of blocks have been described with regard to FIGS. 5, 7, and 9, the blocks and/or the order of the blocks may be modified in other implementations. Further, non-dependent blocks may be performed in parallel. In addition, other blocks may be provided, or blocks may be eliminated, from the described flowcharts, and other components may be added to, or removed from, the described systems.

It will be apparent that aspects described herein may be implemented in many different forms of software, firmware, and hardware in the implementations illustrated in the figures. The actual software code or specialized control hardware used to implement aspects does not limit the implementations. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the disclosed implementations unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   identifying, by at least one of the one or more server devices, sub-pages corresponding to a particular webpage,
      the particular webpage and the identified sub-pages being associated with a same website;
   determining, by at least one of the one or more server devices, titles for the identified sub-pages;
   processing, by at least one of the one or more server devices, the identified sub-pages to select a plurality of sub-pages, of the identified sub-pages, to use to generate a snippet for the particular webpage,
      each sub-page of the plurality of sub-pages satisfying particular criteria,
         a sub-page, of the plurality of sub-pages, satisfying the particular criteria based on a title of the sub-page lacking one or more particular characters;
   generating, by at least one of the one or more server devices, the snippet, for the particular webpage, using the titles for the plurality of sub-pages; and
   storing, by at least one of the one or more server devices, the generated snippet in association with the particular webpage,
      the generated snippet being presented in a search result document when the particular webpage is identified as being relevant to a search query.

2. The method of claim 1, where processing the identified sub-pages to select the plurality of sub-pages includes:
   determining that one of the plurality of sub-pages is linked to by the particular webpage, and
   selecting the one of the plurality of sub-pages to use to generate the snippet based on the one of the plurality of sub-pages being linked to by the particular webpage.

3. The method of claim 1, where processing the identified sub-pages to select the plurality of sub-pages includes:
   determining a measure of quality of one of the plurality of sub-pages,
   determining that the measure of quality, of the one of the plurality of sub-pages, satisfies a threshold, and
   selecting the one of the plurality of sub-pages to use to generate the snippet based on the measure of quality, of the one of the plurality of sub-pages, satisfying the threshold.

4. The method of claim 1, where processing the identified sub-pages to select the plurality of sub-pages includes:
   determining a length of a title for one of the plurality of sub-pages,
   determining that the length of the title, for the one of the plurality of sub-pages, satisfies a threshold, and
   selecting the one of the plurality of sub-pages to use to generate the snippet based on the length of the title, for the one of the plurality of sub-pages, satisfying the threshold.

5. The method of claim 1, where processing the identified sub-pages to select the plurality of sub-pages includes:
   determining that a title, for one of the plurality of sub-pages, lacks the one or more particular characters,
      the one or more particular characters including a comma, a dash, or a period, and
   selecting the one of the plurality of sub-pages to use to generate the snippet based on the title, for the one of the plurality of sub-pages, lacking the one or more particular characters.

6. The method of claim 1, where processing the identified sub-pages to select the plurality of sub-pages includes:
   determining a first length of a title for one of the plurality of sub-pages,
   determining a second length of one or more titles of one or more of the plurality of sub-pages,
      the one or more of the plurality of sub-pages being different from the one of the plurality of sub-pages,
   determining a total length based on a sum of the first length and the second length,
   determining that the total length satisfies a threshold, and
   selecting the one of the plurality of sub-pages to use to generate the snippet based on the total length satisfying the threshold.

7. The method of claim 1, where generating the snippet includes:
   concatenating the titles, for the plurality of sub-pages, to form a concatenation of titles, and
   generating the snippet using the concatenation of titles.

8. A system, comprising:
   one or more server devices to:
      identify sub-pages corresponding to a particular webpage,
         the particular webpage and the identified sub-pages being associated with
      a same website;
      determine titles for the identified sub-pages;
      process the identified sub-pages to select a plurality of sub-pages, of the identified sub-pages, to use to generate a snippet for the particular webpage,
         each sub-page of the plurality of sub-pages satisfying particular criteria,
            a sub-page, of the plurality of sub-pages, satisfying the particular criteria based on a title of the sub-page lacking at least one particular character;
      generate the snippet, for the particular webpage, using the titles for the plurality of sub-pages; and
      store the generated snippet in association with the particular webpage,
         the generated snippet being presented in a search result document when the particular webpage is identified as being relevant to a search query.

9. The system of claim 8, where the one or more server devices, when processing the identified sub-pages to select the plurality of sub-pages, are to:
   determine a measure of quality of one of the plurality of sub-pages,
   determine that the measure of quality, of the one of the plurality of sub-pages, satisfies a threshold, and
   select the one of the plurality of sub-pages to use to generate the snippet based on the measure of quality, of the one of the plurality of sub-pages, satisfying the threshold.

10. The system of claim 8, where the one or more server devices, when processing the identified sub-pages to select the plurality of sub-pages, are to:
  determine a length of a title for one of the plurality of sub-pages,
  determine that the length of the title, for the one of the plurality of sub-pages, satisfies a threshold, and
  select the one of the plurality of sub-pages to use to generate the snippet based on the length of the title, for the one of the plurality of sub-pages, satisfying the threshold.

11. The system of claim 8, where the one or more server devices, when processing the identified sub-pages to select the plurality of sub-pages, are to:
  determine a first length of a title for one of the plurality of sub-pages,
  determine a second length of one or more titles of one or more of the plurality of sub-pages,
    the one or more of the plurality of sub-pages being different from the one of the plurality of sub-pages,
  determine a total length based on a sum of the first length and the second length,
  determine that the total length satisfies a threshold, and
  select the one of the plurality of sub-pages to use to generate the snippet based on the total length satisfying the threshold.

12. The system of claim 8, where the one or more server devices, when identifying the sub-pages, are to:
  determine the sub-pages based on a link structure or a website hierarchy of the website,
    the sub-pages being determined based on positions of the sub-pages, relative to the particular webpage, in the link structure or the website hierarchy.

13. The system of claim 8, where the one or more server devices are further to:
  receive the search query;
  identify the particular webpage as being relevant to the search query;
  generate the search result document,
    the search result document including the snippet generated for the particular webpage; and
  provide the search result document as a response to the search query.

14. The system of claim 8, where the one or more server devices, when processing the identified sub-pages to select the plurality of sub-pages, are to:
  determine that one of the plurality of sub-pages is linked to by the particular webpage,
  determine a measure of quality of the one of the plurality of sub-pages,
  determine a length of a title for the one of the plurality of sub-pages,
  determine that the title, for the one of the plurality of sub-pages, lacks one or more particular characters, and
  select the one of the plurality of sub-pages to use to generate the snippet based on:
    the one of the plurality of sub-pages being linked to by the particular webpage,
    the measure of quality, of the one of the plurality of sub-pages, satisfying a first threshold,
    the length of the title, for the one of the plurality of sub-pages, satisfying a second threshold, and
    the title, for the one of the plurality of sub-pages, lacking the one or more particular characters.

15. A non-transitory computer-readable medium storing instructions, the instructions comprising:
  a plurality of instructions which, when executed by one or more processors, cause the one or more processors to:
    identify sub-pages corresponding to a particular webpage,
      the particular webpage and the identified sub-pages being associated with
    a same website;
    determine titles for the identified sub-pages;
    process the identified sub-pages to select a plurality of sub-pages, of the identified sub-pages, to use to generate a snippet for the particular webpage,
      each sub-page of the plurality of sub-pages satisfying particular criteria,
      a sub-page, of the plurality of sub-pages, satisfying the particular criteria based on a title of the sub-page lacking one or more particular characters;
    generate the snippet, for the particular webpage, using the titles for the plurality of sub-pages; and
    store the generated snippet in association with the particular webpage,
      the generated snippet being presented in a search result document when the particular webpage is identified as being relevant to a search query.

16. The non-transitory computer-readable medium of claim 15, where one or more instructions, of the plurality of instructions, to process the identified sub-pages to select the plurality of sub-pages include:
  one or more instructions which, when executed by the one or more processors, cause the one or more processors to:
    determine that one of the plurality of sub-pages is linked to by the particular webpage, and
    select the one of the plurality of sub-pages to use to generate the snippet based on the one of the plurality of sub-pages being linked to by the particular webpage.

17. The non-transitory computer-readable medium of claim 15, where one or more instructions, of the plurality of instructions, to process the identified sub-pages to select the plurality of sub-pages include:
  one or more instructions which, when executed by the one or more processors, cause the one or more processors to:
    determine a length of a title for one of the plurality of sub-pages,
    determine that the length of the title, for the one of the plurality of sub-pages, satisfies a threshold, and
    select the one of the plurality of sub-pages to use to generate the snippet based on the length of the title, for the one of the plurality of sub-pages, satisfying the threshold.

18. The non-transitory computer-readable medium of claim 15, where one or more instructions, of the plurality of instructions, to process the identified sub-pages to select the plurality of sub-pages include:
  one or more instructions which, when executed by the one or more processors, cause the one or more processors to:
    determine a first length of a title for one of the plurality of sub-pages,
    determine a second length of one or more titles of one or more of the plurality of sub-pages,
      the one or more of the plurality of sub-pages being different from the one of the plurality of sub-pages,
    determine a total length based on a sum of the first length and the second length,
    determine that the total length satisfies a threshold, and
    select the one of the plurality of sub-pages to use to generate the snippet based on the total length satisfying the threshold.

19. The non-transitory computer-readable medium of claim 15, where one or more instructions, of the plurality of instructions, to identify the sub-pages include:
one or more instructions which, when executed by the one or more processors, cause the one or more processors to:
determine the sub-pages based on a link structure or a website hierarchy of the website,
the sub-pages being determined based on positions of the sub-pages, relative to the particular webpage, in the link structure or the website hierarchy.

20. The non-transitory computer-readable medium of claim 15, where one or more instructions, of the plurality of instructions, to process the identified sub-pages to select the plurality of sub-pages include:
one or more instructions which, when executed by the one or more processors, cause the one or more processors to:
determine that one of the plurality of sub-pages is linked to by the particular webpage,
determine a measure of quality of the one of the plurality of sub-pages,
determine a length of the title for the one of the plurality of sub-pages,
determine that the title, for the one of the plurality of sub-pages, lacks one or more particular characters, and
select the one of the plurality of sub-pages to use to generate the snippet based on:
the one of the plurality of sub-pages being linked to by the particular webpage,
the measure of quality, of the one of the plurality of sub-pages, satisfying a first threshold,
the length of the title, for the one of the plurality of sub-pages, satisfying a second threshold, and
the title, for the one of the plurality of sub-pages, lacking the one or more particular characters.

* * * * *